UNITED STATES PATENT OFFICE.

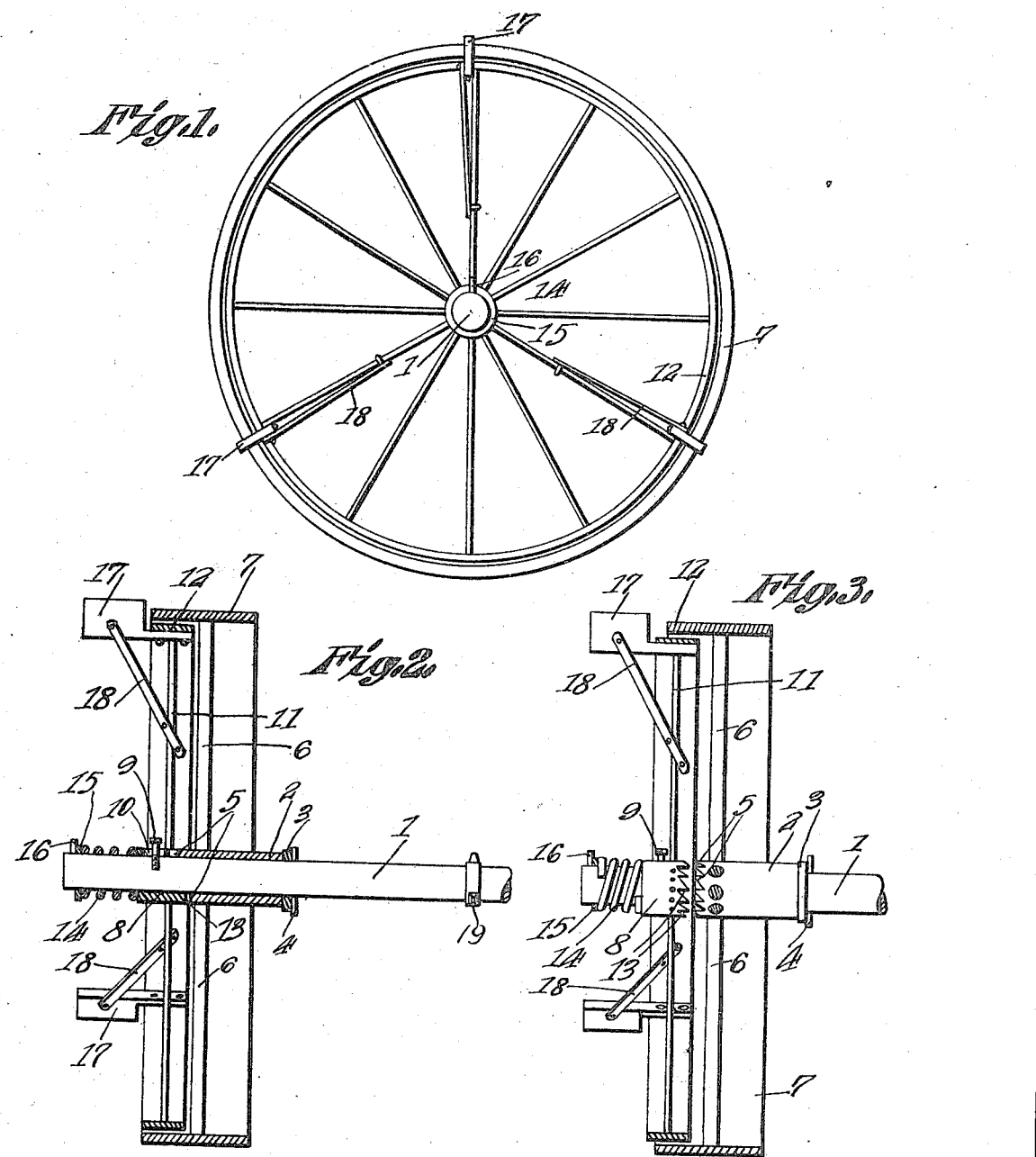

ELZO EUSTACE SNEDIGAR, OF SIOUX PASS, MONTANA, ASSIGNOR OF ONE-HALF TO ALBERT W. WELLS, OF SIOUX PASS, MONTANA.

CHECK-ROW-PLANTER ATTACHMENT.

1,268,291.     Specification of Letters Patent.     Patented June 4, 1918.

Application filed August 29, 1917. Serial No. 188,806.

*To all whom it may concern:*

Be it known that I, ELZO EUSTACE SNEDIGAR, a citizen of the United States, residing at Sioux Pass, in the county of Richland and State of Montana, have invented a new and useful Check-Row-Planter Attachment, of which the following is a specification.

The subject of this invention is an attachment for check row planters wherein a marker is associated with the wheels of the planter, and the objects of the invention are, first, to provide an attachment which will take the place of the check wire, second, to provide an attachment which may be readily placed on a check row planter, third, to provide a check row planter attachment which may be readily set to match or track with former markings, fourth, to provide a marker which will automatically stop marking when the planter is being backed, fifth, to provide a simple and efficient check row marker.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

A practical embodiment of the invention is shown in the accompanying drawing, wherein:

Figure 1 is a side elevation of the attachment in place on a planter wheel.

Fig. 2 is a central vertical section, a fragment of the axle shown in elevation.

Fig. 3 is a similar view, the hubs being in elevation and in the position assumed when the planter is being backed.

Referring to the drawing by numerals of reference:

Since the attachments on both wheels of a planter are exact duplicates only one wheel is illustrated herein so as to simplify the showing and assure a more ready understanding of the structure.

The axle of a planter is indicated at 1, and upon this axle is loosely mounted a hub 2, the inward movement of which along the axle is limited by a washer 3 which abuts a pin 4 passing through an aperture in the axle. The hub 2 is serrated at one end to form teeth 5 as shown.

Secured on the hub 2 through spokes 6 is a rim 7, the whole constituting a wheel of the planter.

A hub 8 is slidably mounted on the axle 1 with which it is constrained to revolve by a lug or pin 9 which is affixed in the axle 1 and extends through a slot 10 formed in the hub 8. Spokes 11 are secured about the hub 8, from which they radiate, and support a rim 12, which is adapted to enter the rim 7 of the planter wheel, where it normally rests. The hub 8 is provided, at one end, with teeth 13 which are adapted to engage the teeth 5 of hub 2. The hub 8 is held in yielding contact with the hub 2 by a coiled spring 14 which surrounds the end of shaft 1 and is held thereon by a washer 15 and retaining pin 16.

As will be seen most clearly in Figs. 2 and 3, one face of each tooth 5 and 13 lies longitudinally of the axle 1 while the other face is inclined. By this arrangement the hubs are constrained to turn in unison when the planter moves forward, but when the planter is backed, the inclined faces slide upon each other causing the hubs to separate and compressing the spring 14 which causes the axle and marker wheel to remain stationary.

Secured to the rim 12 of the marker wheel at intervals thereabout are laterally extending marker blades or arms 17 which may be supported by bracket arms 18 which are secured to the spokes 11 and the arms 17.

A sprocket 19 is provided on the shaft 1 which may be geared through a sprocket chain, not shown, to a sprocket on the shaft which actuates the seed dropping plates. This structure being old and well known, is not illustrated.

In practice the device operates in the following manner: The seed plates operate as usual, the gearing being so timed that the dropping of the seed will correspond with the impress of the markers 17 in the soil. As the planter progresses along the field, the hubs 2 and 8 will be in contact and the teeth engaged so that the marker wheel and axle will rotate in unison with the supporting wheels of the planter. When a row is finished and the planter turned to begin the return row, it may be readily backed to bring the marker arms 17 into alinement with the previous markings. This is rendered possible by the fact that the marker wheel remains stationary during backing, as heretofore explained.

Having thus described the invention, what is claimed as new and sought by Letters Patent, is:

1. A check row planter attachment, comprising in combination with a planter and its axle, a supporting wheel, including a hub, loosely mounted on the axle, teeth on the hub, a marker wheel sliding on the axle, a hub for the marker wheel, teeth on the hub and adapted to engage the before mentioned teeth, and resilient means for retaining the teeth in engagement, whereby the supporting wheel and marker wheel will travel in unison when the planter advances, and the supporting wheel alone will rotate when the planter is backing.

2. A check row planter attachment, comprising in combination with a planter and its axle, a supporting wheel, including a hub loosely mounted on the axle, teeth on the hub, a marker wheel sliding on the axle and normally lying within the supporting wheel, a hub for the marker wheel, teeth on the hub and adapted to engage the before mentioned teeth, marker arms secured to the marker wheel, and resilient means for retaining the teeth in engagement.

In testimony that I claim the foregoing as my own, I have hereto affixed my signature in the presence of two witnesses.

ELZO EUSTACE SNEDIGAR.

Witnesses:
MARY A. WELLS,
EMMA L. CREECH.

Copies of this patent may be obtained for five cents each, by addressing the "Commissioner of Patents, Washington, D. C."